F. O'NEILL.
NECK MOLD FOR BOTTLE BLOWING MACHINES.
APPLICATION FILED JULY 18, 1916.
1,231,188.
Patented June 26, 1917.
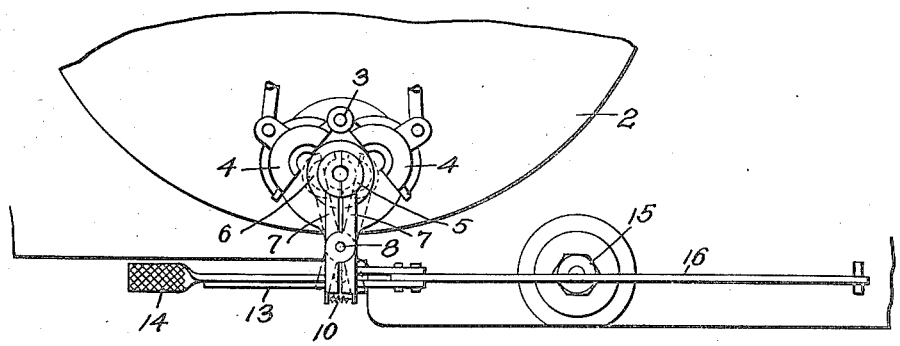
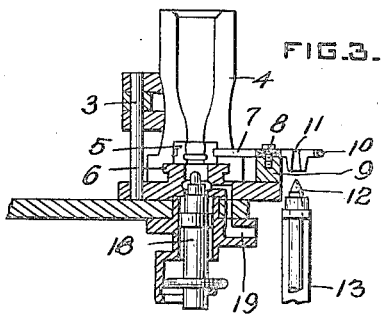
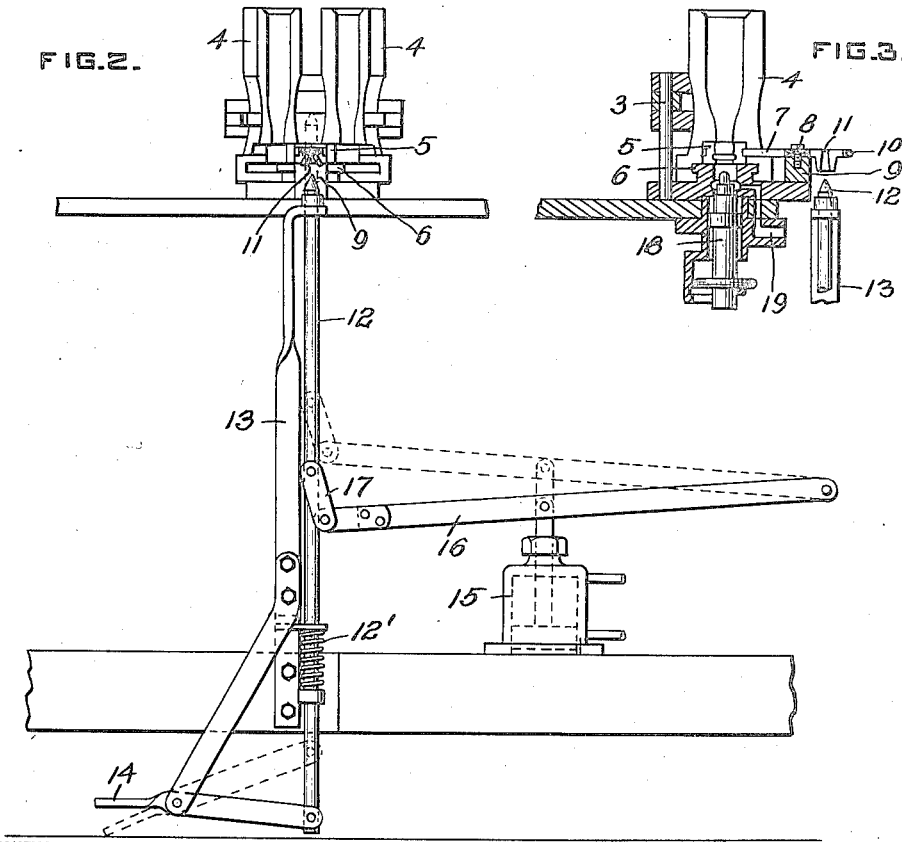

UNITED STATES PATENT OFFICE.

FRANK O'NEILL, OF TOLEDO, OHIO.

NECK-MOLD FOR BOTTLE-BLOWING MACHINES.

1,231,188. Specification of Letters Patent. Patented June 26, 1917.

Application filed July 18, 1916. Serial No. 109,872.

*To all whom it may concern:*

Be it known that I, FRANK O'NEILL, a citizen of the United States, and resident of Toledo, in the county of Lucas and State of Ohio, have invented certain new and useful Improvements in Neck-Molds for Bottle-Blowing Machines, of which the following is a specification.

In various types of bottle blowing machines it is usual practice to utilize a neck mold in connection with the main mold, the primary function of the neck mold being to form the neck or mouth end of the bottle, imparting thereto the requisite exterior configuration. The neck mold is also commonly utilized for transferring the molded article after the main mold has been opened or removed. In some types of machines the portable neck mold is adapted to coöperate interchangeably with both the blow and blank molds, in its initial position coöperating with the blank mold and shaping the neck end of the blank, and then serving as a transfer device for moving the blank into operative position with relation to the blow mold. At the completion of the blowing operation the neck mold is again utilized for removing the blown article from the forming machine.

The primary purpose of the present invention is to permanently mount the neck mold on the main mold support or carrier, and to provide means with which the carrier is adapted to place the neck mold into operative relation for opening the latter and releasing the article so that it may be transferred as required by means of a hand implement of pincer form. One advantage resulting from the invention is that the neck mold is permanently mounted with reference to the main mold and hence always in proper position relatively thereto. With the neck mold portable and serving as a transfer device, both the main and neck molds are frequently damaged as a result of the rapid and more or less rough manipulation of the neck mold incident to moving it to and from operative position with relation to the main mold. The expense of repairing molds damaged in this way is a considerable item. With the neck mold permanently mounted no injury of the character referred to can result to either mold. A further advantage of the invention results from opening the neck mold by mechanical means, thereby decreasing the manual work as compared with the former practice of opening it by hand.

In the accompanying drawings, Figure 1 is a view in top plan of the improved mechanism, showing a portion of the rotatable mold carrier of a bottle forming machine. Fig. 2 is an elevation of the mechanism illustrated in Fig. 1. Fig. 3 is a vertical section of the molds taken at right angles to Fig. 2, the molds being in closed position.

Referring to the drawings, 2 designates a portion of a carrier that may be rotatable about a vertical axis, such for instance as the carrier indicated by the same numeral in my pending application, Serial No. 855,362, filed August 6, 1914. Secured to the carrier by hinge 3 are sections 4 of the main mold which, in the present instance, is a blank mold in which the blank is formed prior to blowing it in a blow mold. It will be understood, however, that the neck mold mechanism hereinafter described may coöperate with any desired type of main mold, and that the term main mold as employed herein is not restricted to the specific type illustrated but is intended to refer to and embrace any mold with which the neck mold is adapted to coöperate.

The main mold 4, being in the instance illustrated a blank mold, has its lower end shaped to embrace the sectional neck mold 5, the latter being adapted to open and close on the bottom plate 6 secured to carrier 2.

The sections of the neck mold 5 are secured to crossed arms 7, the latter pivotally mounted at 8 on block 9 rising from carrier 2. A contractile coiled spring 10 connects the outer ends of arms 7 to maintain mold 5 normally closed. The inner sides of the extended portions of the arms are formed with the socket-like passage or cavity 11 which is adapted to be moved by carrier 2 into alinement with the vertically movable bar 12 having its reduced upper extremity adapted to enter socket 11 and separate arms 7 against the pull of spring 10 and thereby open the neck mold as in dotted lines in Fig. 1 and release the article formed in molds 4 and 5, mold 4 having been previously opened as shown in Fig. 1. With the article thus released it may be grasped by a suitable hand implement, for instance one of pincer form, for removing and transferring it to its next position, whether to a blow mold or elsewhere.

Bar 12 is movable vertically in support or bracket 13, being held normally depressed and out of the path of arms 7 by spring 12'. When the neck mold is to be opened, bar 12 may be actuated manually by the treadle 14, or mechanically or automatically by the air cylinder and piston 15, the latter connected to the vertically swinging arm 16 with said arm, in turn, connected to bar 12 by link 17. When the cylinder and piston are active, their operation may be so timed as to open the neck mold at the proper moment. Both forms of operating mechanisms may remain connected to bar 12 with either mechanism active, the inactive mechanism simply working idly and in no way interfering with the operation. Or, if desired, the inactive mechanism may be disconnected.

In Fig. 3, plunger mechanism 18 is illustrated in depressed position whereby air may be admitted to the mold cavity through the lateral port 19 for blowing the article within mold 4. This plunger mechanism is of the construction shown and described in my pending application, Serial No. 106,618, filed June 29, 1916. It will be understood, however, that the present invention is not restricted in this regard, nor indeed to any form of plunger mechanism, the same being operative quite irrespective of other forming instrumentalities that may be employed.

I claim:

1. The combination of a movable carrier, a main mold, a sectional neck mold adapted to coöperate with the main mold, supporting devices for the neck mold sections movably mounted on the carrier, and a vertically movable device having otherwise fixed position, the carrier adapted to move the neck mold supports into operative alinement with said device, and means for moving said device vertically for separating said supports and opening the neck mold.

2. The combination of a mold carrier, a main mold, a horizontally opening neck mold adapted to coöperate with the main mold, devices projecting from and movable with the neck mold sections, and a mold opening device adapted to be moved between said projecting devices for opening the neck mold, said mold opening device supported adjacent to but independently of the mold carrier.

3. The combination of a mold carrier, a main mold, a horizontally opening sectional neck mold beneath and adapted to coöperate with the main mold, supporting devices for the neck mold sections movably mounted on the carrier and projecting therefrom, and a movable device located outside the path of movement of the carrier and supported independently of the latter and adapted to be entered between said supporting devices for separating them and opening the neck mold.

4. The combination of a horizontally movable mold carrier, a sectional mold, mold supporting arms pivotally secured to the carrier between the outer edge of the latter and the mold sections with said arms projecting beyond the carrier, and a vertically movable device located beyond the path of movement of the carrier and adapted to be projected into engagement with the extended portions of the arms for actuating the latter to open the mold.

5. The combination of a horizontally movable mold carrier, a sectional open bottom main mold mounted on the carrier, a sectional neck mold beneath and adapted to register with the main mold, movable supporting means for the neck mold sections permanently mounted on the carrier, and a movable device having fixed position and with which the carrier is adapted to place the neck mold supporting means in operative relation for opening the neck mold.

6. The combination of a horizontally movable mold carrier, a sectional open-bottom main mold permanently mounted on the carrier, a sectional neck mold beneath and adapted to register with the main mold, a pair of arms permanently pivoted to the carrier with the neck mold sections secured to said arms and with the latter projecting beyond the mold carrier, and a device operative beyond the path of movement of the mold carrier for actuating said arms to open the neck mold.

In testimony whereof I affix my signature in presence of two witnesses.

FRANK O'NEILL.

Witnesses:
ALEX S. MABON,
J. M. NESBIT.